(12) United States Patent
Liu et al.

(10) Patent No.: US 9,292,799 B2
(45) Date of Patent: Mar. 22, 2016

(54) GLOBAL MODEL FOR FAILURE PREDICTION FOR ARTIFICIAL LIFT SYSTEMS

(71) Applicants: Yintao Liu, Los Angeles, CA (US); Ke-Thia Yao, Los Angeles, CA (US); Cauligi S. Raghavendra, Los Angeles, CA (US); Anqi Wu, Los Angeles, CA (US); Dong Guo, Los Angeles, CA (US); Jingwen Zheng, Los Angeles, CA (US); Lanre Olabinjo, San Ramon, CA (US); Oluwafemi Balogun, San Ramon, CA (US); Iraj Ershaghi, Los Angeles, CA (US)

(72) Inventors: Yintao Liu, Los Angeles, CA (US); Ke-Thia Yao, Los Angeles, CA (US); Cauligi S. Raghavendra, Los Angeles, CA (US); Anqi Wu, Los Angeles, CA (US); Dong Guo, Los Angeles, CA (US); Jingwen Zheng, Los Angeles, CA (US); Lanre Olabinjo, San Ramon, CA (US); Oluwafemi Balogun, San Ramon, CA (US); Iraj Ershaghi, Los Angeles, CA (US)

(73) Assignees: Chevron U.S.A. Inc., San Ramon, CA (US); University of Southern California, Los Angeles, CA (US)

( * ) Notice: Subject to any disclaimer, the term of this patent is extended or adjusted under 35 U.S.C. 154(b) by 56 days.

(21) Appl. No.: 13/830,875

(22) Filed: Mar. 14, 2013

(65) Prior Publication Data

US 2014/0244552 A1 Aug. 28, 2014

Related U.S. Application Data

(60) Provisional application No. 61/771,017, filed on Feb. 28, 2013.

(51) Int. Cl.
*G06N 5/00* (2006.01)
*G06F 1/00* (2006.01)
*G06N 99/00* (2010.01)
*E21B 41/00* (2006.01)
*G06F 11/30* (2006.01)
*E21B 47/00* (2012.01)

(52) U.S. Cl.
CPC .............. *G06N 99/005* (2013.01); *E21B 41/00* (2013.01); *E21B 47/0007* (2013.01); *G06F 11/30* (2013.01)

(58) Field of Classification Search
CPC ........... G06N 5/04; G06N 5/02; G06N 5/048; G06Q 50/01
See application file for complete search history.

(56) References Cited

U.S. PATENT DOCUMENTS

| 8,988,236 | B2 | 3/2015 | Liu et al. | |
|---|---|---|---|---|
| 8,988,237 | B2 | 3/2015 | Liu et al. | |
| 2005/0131847 | A1* | 6/2005 | Weston et al. | 706/12 |

(Continued)

OTHER PUBLICATIONS

Liu, Y., et al. "Automatic Early Fault Detection for Rod Pump Systems" SPE 146038 (2011).

(Continued)

*Primary Examiner* — Jeffrey A Gaffin
*Assistant Examiner* — Kalpana Bharadwaj
(74) *Attorney, Agent, or Firm* — Andrew J. Lagatta; E. Joseph Gess

(57) ABSTRACT

Methods and systems for predicting failures in an artificial lift system are disclosed. One method includes extracting one or more features from a dataset including time sampled performance of a plurality of artificial lift systems disposed across a plurality of different oil fields, the dataset including data from failed and normally operating artificial lift systems. The method also includes forming a learning model based on identified pre-failure signatures in the extracted features, the learning model configured to predict a failure of an artificial lift system based on observation of one of the identified pre-failure signatures in operational data received from the artificial lift system.

21 Claims, 11 Drawing Sheets

(56) References Cited

U.S. PATENT DOCUMENTS

2005/0288819 A1* 12/2005 de Guzman .................... 700/245
2012/0215364 A1* 8/2012 Rossi ............................ 700/281
2013/0080117 A1 3/2013 Liu et al.
2013/0173165 A1 7/2013 Balogun et al.
2013/0173505 A1 7/2013 Balogun et al.

OTHER PUBLICATIONS

Liu, Y., et al. "Failure Prediction for Rod Pump Artificial Lift Systems", SPE 133545 (2010).

Hamerly, G. et al., "Bayesian approaches to failure prediction for disk drives", In Proc. 18th ICML, San Diego, California, 2001.

Hughes, G.F., et al., "Improved Disk-Drive Failure Warnings", IEEE Transactions on Reliability, 2002, vol. 51, No. 3, pp. 350-357.

Wong, W., et al., "Bayesian Network Anomaly Pattern Detection for Disease Outbreaks", Proceedings of the Twentieth International Conference on Machine Learning, 2003.

Shmueli, G., et al., "Statistical Challenges Facing Early Outbreak Detection in Biosurveillance", American Statistical Association and the American Society for Quality, Technometrics, 2010, vol. 52, No. 1, pp. 39-51.

Scheffer, M. et al., "Early-warning signals for critical transitions", Nature, 2009, vol. 461, No. 3, pp. 53-59.

Hall, H., et al., "The WEKA Data Mining Software: An Update", SIGKDD Explorations, vol. 11, No. 1, pp. 10-18.

Chen, P. et al., "A Tutorial on v-Support Vector Machines", Learning with Kernels: Support Vector Machines, Regularization, Optimization, and Beyond, Bernhard Scholkopf and Alexander J. Smola, ed., MIT Press, 2002.

Chang, C., et al., "LIBSVM: A Library for Support Vector Machines", Department of Computer Science, National Taiwan University, 2001, pp. 1-39 (maintained at http://www.csie.ntu.edu.tw/~cjlin/papers/libsvm.pdf).

Huang, T., et al., "Generalized Bradley-Terry Models and Multi-Class Probability Estimates," Journal of Machine Learning Research, 2006, vol. 7, pp. 85-115.

Salfner, F., et al., "A Survey of Online Failure Prediction Methods," ACM Computing Surveys, 2010, vol. 42, No. 3, Art. 10, pp. 10:1-10:42.

Liu, Y., K.-T. Yao, S. Liu, C. S. Raghavendra, O. Balogun and L. Olabinjo, "Semi-supervised Failure Prediction for Oil Production Wells," in IEEE 11th International Conference on Data Mining Workshops, Vancouver, Canada, 2011.

\* cited by examiner

GLOBAL MODEL FOR FAILURE PREDICTION FOR ARTIFICIAL LIFT SYSTEMS

CROSS-REFERENCE TO RELATED APPLICATIONS

The present application claims priority to U.S. Provisional Patent Application No. 61/771,017, filed Feb. 28, 2013, the disclosure of which is hereby incorporated by reference in its entirety.

TECHNICAL FIELD

The present disclosure relates generally to failure prediction for artificial lift systems, such as those useable in oil fields. In particular, the present disclosure relates to a global model for failure prediction for artificial lift systems.

BACKGROUND

Artificial lift systems are widely used in the oil industry to enhance production from reservoirs that have levels which are too low to directly lift fluids to the surface. There are a variety of artificial lift techniques in the industry, such as Gas Lift, Hydraulic Pumping Units, Electric Submersible Pump, Progressive Cavity Pump and Rod Pump techniques. Among these, the Sucker Rod Pump technique is the most commonly used.

The reasons for rod pump failures can be broadly classified into two main categories: mechanical and chemical. Mechanical failures are caused by improper design improper manufacturing or from wear and tear during operations. Well conditions may contribute to excessive wear and tear, such as sand intrusions, gas pounding, rod cutting and asphalting. Chemical failures are caused by the corrosive nature of the fluid being pumped through the systems. For example, the fluid may contain $H_2S$ or bacteria. For rod pumps, one of the major mechanical failures is referred to as Tubing Failure, where tubing of the pump leaks due to accumulated mechanical friction and cutting events. A tubing leak does not cause a rod pump to shut down, but rather reduces the pump efficiency. Such tubing leaks are difficult to identify, because they occur downhole, and are difficult to locate via visual or sound inspection.

In a typical oil field, there are hundreds of wells, and there are many fields operated by the same organization that may have various geological formations. Well failures in oil field assets lead to production loss and can greatly increase the operational expense. Accordingly, to the extent possible, it is desirable to avoid well failures, for example by identifying anomalies in well operation prior to well failure.

It is possible, in some cases, to identify anomalies by combining different types of information such as recent performance of the well, an events log associated with the well, and performance of neighboring wells. Such anomalies, once identified, have high probability to be followed by a failure in the future. For example, such anomalies might have already been causing economic losses. Accordingly, it would be desirable to schedule either proactive maintenance or repair to reduce such losses. However, with limited number of trained personnel and resources for managing large fields, such proactive operation is difficult to accomplish.

Recently, oil fields have been increasingly instrumented, with volumes of data being collected. This data includes historical event log and time series parametric data. Such field data, along with an expert's prior knowledge regarding the types of errors encountered and in particular in the region where the oil field is located, are very useful to data mining methodologies to predict well failures. However, even these systems have disadvantages. For example, because wells often perform differently in different conditions, it may be the case that a well in a particular location may perform substantially differently than a similar well placed in a different location, for example due to the environmental conditions at the well site, or due to subsurface conditions. Accordingly, monitoring systems may still be able to compare closely-located wells to detect anomalies, any performance degradation measures (e.g., performance thresholds set at which degradation is assumed) at those wells may not be well suited to other wells at other locations. For these reasons, existing systems that monitor instrumented wells are typically limited to localized areas to avoid having to account for variances across operating conditions. Such limited-use systems are sub-optimal, at least because they cannot be applied universally across oil fields, and require each system to be monitored and/or updated individually.

SUMMARY

In accordance with the present disclosure, the above and other issues are addressed by the following:

In a first aspect, a method for predicting failures in an artificial lift system includes extracting one or more features from a dataset including time sampled performance of a plurality of artificial lift systems disposed across a plurality of different oil fields, the dataset including data from failed and normally operating artificial lift systems. The method also includes forming a learning model based on identified pre-failure signatures in the extracted features, the learning model configured to predict a failure of an artificial lift system based on observation of one of the identified pre-failure signatures in operational data received from the artificial lift system.

In a second aspect, a computer-readable medium is disclosed that has computer-executable instructions stored thereon which, when executed by a computing system, cause the computing system to perform a method for predicting failures in an artificial lift system. The method includes extracting one or more features from a dataset including time sampled performance of a plurality of artificial lift systems disposed across a plurality of different oil fields, the dataset including data from failed and normally operating artificial lift systems. The method also includes forming a learning model based on identified pre-failure signatures in the extracted features, the learning model configured to predict a failure of an artificial lift system based on observation of one of the identified pre-failure signatures in operational data received from the artificial lift system.

In a third aspect, a system for predicting failures in an artificial lift system is disclosed. The system includes a data collection component configured to receive time-sampled data from each of a plurality of artificial lift systems disposed across a plurality of different oil fields, the dataset including data from failed and normally operating artificial lift systems. The system also includes a data labeling component configured to receive data labels from a user, the data labels defining one or more types of failures of artificial lift systems. The system further includes a learning model generated by a multi-class support vector machine based on the labeled data, the learning model including one or more identified pre-failure signatures and predict a failure of an artificial lift system based on observation of one of the identified pre-failure signatures in operational data received from the artificial lift system.

DETAILED DESCRIPTION

As briefly described above, embodiments of the present invention are directed to methods and systems that provide a global model for predicting failures of artificial lift systems, such as rod pumps. In some such embodiments discussed herein, a global model can be generated based on annotated training data, which can be used to recognized signatures of pre-failure events occurring in an artificial lift system. By forming a global model for behavior of artificial lift systems, accurate failure predictions associated with such systems can be provided, while concurrently minimizing effort required to keep such models up to date by removing variability issues across oil fields. This can lead to dramatically improved production performance, for example based on adjusted operating parameters to forestall failures or scheduled maintenance to reduce unplanned repairs and to minimize downtime.

In particular, in some embodiments domain knowledge is embedded into an expectation maximization clustering algorithm, thereby allowing a global model to statistically recognize pre-failure and failure patterns from normal patterns during the training stage. Compared with field-specific models, the enriched training set for the global model learns from a wider range of normal and failure examples across all fields with which a generalized Support Vector Machine (SVM) is trained.

Figure 1:
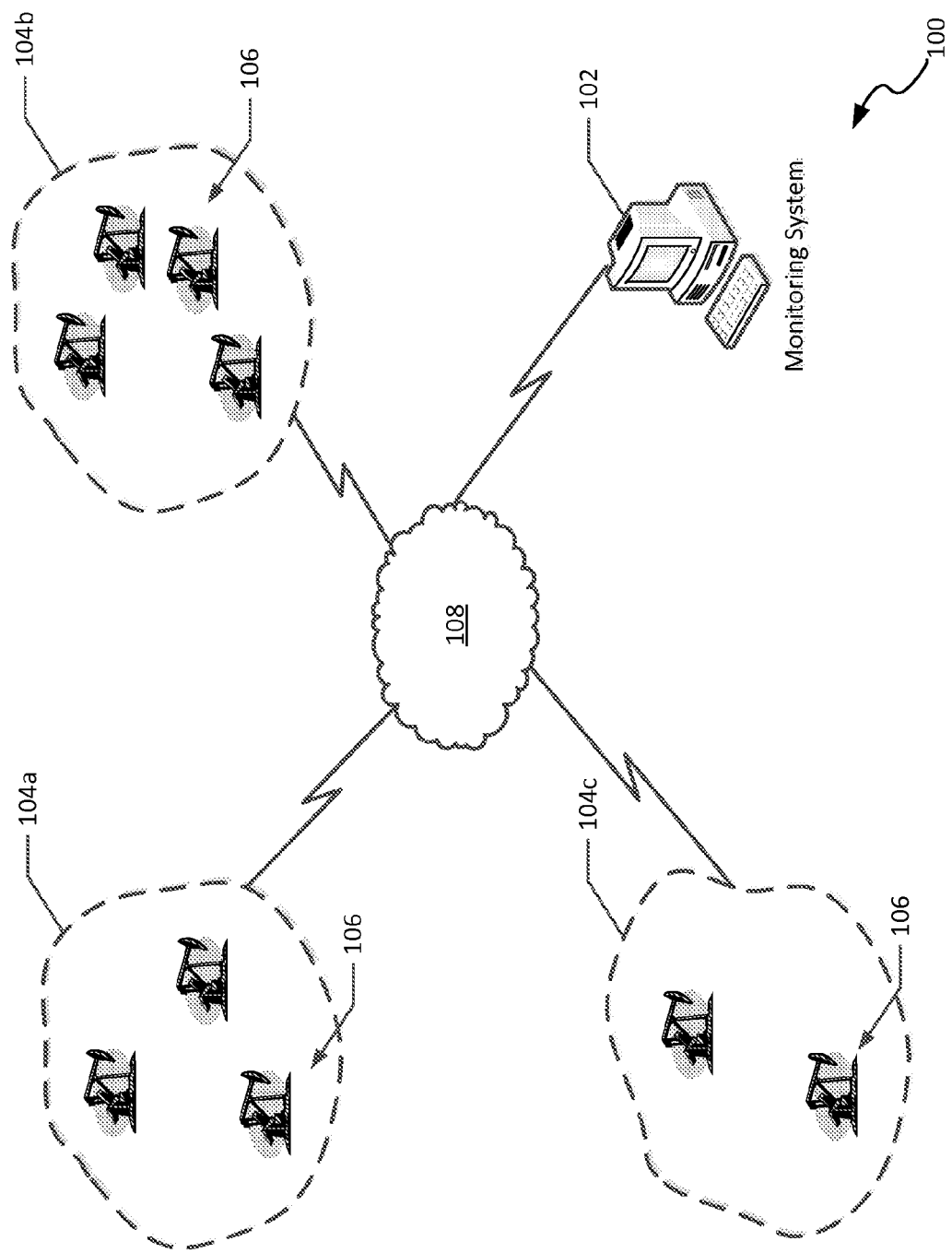
FIG. 1 illustrates an example environment in which the global model for failure prediction of artificial lift systems can be implemented.

Referring now to FIG. 1, an example environment 100 is illustrated in which the global model for failure prediction of artificial lift systems can be implemented. In the embodiment shown, the environment includes a computing system 102 communicatively connected to a plurality of oil fields 104, shown as oil fields 104a-c.

Each of the oil fields 104 includes a plurality of artificial lift systems 106, such as rod pumps, gas lift systems, hydraulic pumps, electric submersible pumps, and progressive cavity pumps. Furthermore, it is noted that each of the oil fields 104 can be located at disparate locations such that the artificial lift systems associated with that oil field are operating in conditions different from the artificial lift systems at a different location. These different operating conditions can correspond to differing temperatures and/or pressures experienced by the artificial lift systems, and can also include differing subsurface conditions, such as particular sediment types and formations, or other features affecting performance of the artificial lift system.

It is noted that, in the embodiment shown, the various artificial lift systems 106 at the oil fields 104 are communicatively connected to the computing system 102, such as via a network 108 (e.g., the Internet), which can include a combination of wired and/or wireless data connections. In particular, specific sensors and/or other monitoring systems included or associated with such artificial lift systems 106 as would be present in an "instrumented" oil field are provided. In such embodiments, the artificial lift systems 106 are capable of periodically reporting operational parameters associate with those systems, including, in a particular example of a rod pump, card area, peak surface load, minimum surface load, strokes per minute, surface stroke length, flow line pressure, pump fillage, prior day cycles, and daily run time. Other parameters could be monitored as well, and in particular as associated with other types of artificial lift systems. In some embodiments, the artificial lift systems 106 included in the present disclosure generate data collected by Pump Off Controllers (POCs). These POCs gather and record periodic well sensor measurements indicating production and well status through load cells, motor sensors, pressure transducers and relays.

The computing system 102 is, in the embodiment shown, used to implement a monitoring system capable of collecting information from one or more types of artificial lift systems across the various oil fields 104, and can include, in some embodiments, an artificial lift surveillance tool useable to detect failed operation and pre-failure operation of an artificial lift system based on past observations of analogous systems, both during normal and failed operation, across a number of different types of operating conditions at the various oil fields 104.

Figure 2:
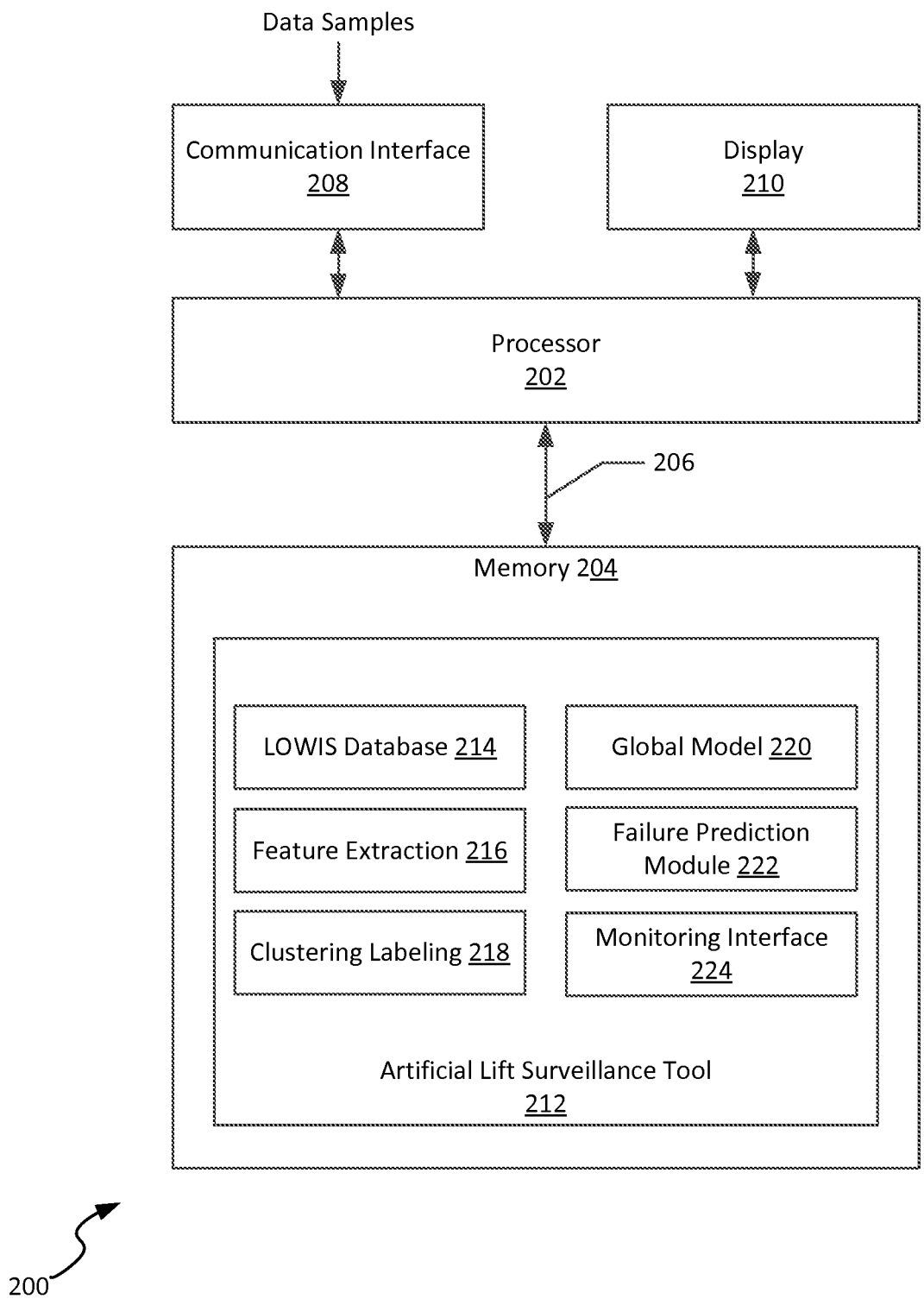
FIG. 2 illustrates an example system useable to generate the global model for failure prediction of artificial lift systems, according to an example embodiment.

Referring now to FIG. 2 a schematic block diagram of a computing system 200 is shown. The computing system 200 can be, in some embodiments, used to implement an artificial lift surveillance tool, as discussed in further detail below, and can be implemented within computing system 102 of FIG. 1. In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. In the embodiment shown, the memory 204 stores an artificial lift surveillance tool 212, discussed in further detail below. The computing system 200 can also include a communication interface 208 configured to receive data streams and transmit notifications as generated by the artificial lift surveillance tool 212, as well as a display 210 for presenting various complex events, or issues relating to a system under observation, or allowing a user to define entities within a system to be monitored, or events to be monitored by the tool 212.

In the embodiment shown, the artificial lift surveillance tool 212 is implemented at least in part using a multi-class support vector machine (SVM) which can be trained using data captured from the plurality of oil wells 104 at various locations. In the embodiment shown the artificial lift surveillance tool 212 also includes a database of monitored data 214, a feature extraction component 216, a clustering component 218, and an associated global model 220. The artificial lift surveillance tool 212 also includes a failure prediction module 222, and a monitoring interface 224.

The database 214, illustrated as a "LOWIS" database ("Life of Well Information Software") stores received historical data about well operation. In various embodiments, the database 214 can store measured data from each of the artificial lift systems, such as card area, peak surface load, minimum surface load, strokes per minute, surface stroke length, flow line pressure, pump fillage, prior day cycles, and daily run time of a rod pump, as well as derived data, such as calculated GB torque, polished rod HP, and net DH pump efficiency. In still further embodiments, features including card unchanged days and daily runtime ratio can be captured. Card unchanged days refers to the case where all card measures (area, peak and min load) reject to change; in such example cases, this integer field keeps increasing with missing dates considered as unchanged. Similarly, daily runtime ratio corresponds to a percentage of runtime with respect to a full 24 hour running. Other parameters, and tracking information for each artificial lift system, could be tracked as well.

Still further examples of tracked data are disclosed in one or more of the following applications: U.S. patent application Ser. No. 13/351,318, entitled "System and Method for Artificial Lift System Analysis"; U.S. patent application Ser. No. 13/351,293, entitled "System and Method for Artificial Lift System Surveillance"; U.S. Patent Pub. No. 2012/0191633, filed on Dec. 20, 2011 and entitled "System and Method for Failure Prediction for Artificial Lift Systems"; and U.S. Patent Pub. 2012/0025997, filed on May 27, 2011, entitled "System and Method for Failure Prediction for Rod Pump Artificial Lift Systems", the disclosures of each of which are hereby incorporated by reference in their entireties.

Figure 5:
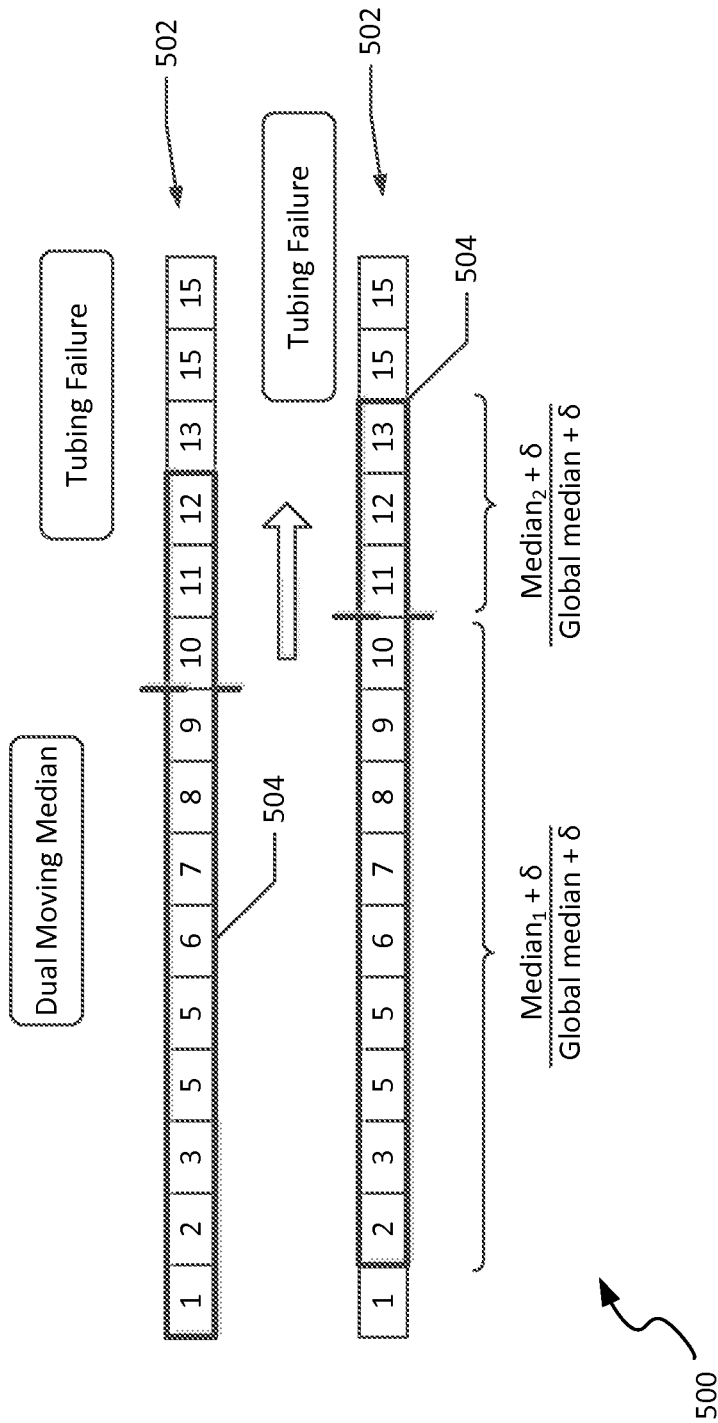
FIG. 5 illustrates a moving average process by which pre-failure behavior is monitored, according to example embodiments discussed herein.

The feature extraction component 216 is configured to extract one or more features from received data at the computing system. In example embodiments, the feature extraction component 216 extracts long-term and short-term trends for existing tracked attributes captured in the database 214. In example embodiments, a dual moving median process is used, such as is illustrated in FIG. 5, below. In general, for each of one or more attributes, the feature extraction component 216 can be configured to extract a number of trends, including a global median representing long-term performance (e.g., over a past number of months), a mid-term median representing a recent performance (e.g., over a past week), and a current performance representing a most recent number of days. In some embodiments, features can be further calculated by dividing the mid-term median and the current performance by the global median, while incorporating a trivial value 6 to account for and avoid computational outliers.

Figure 4A:
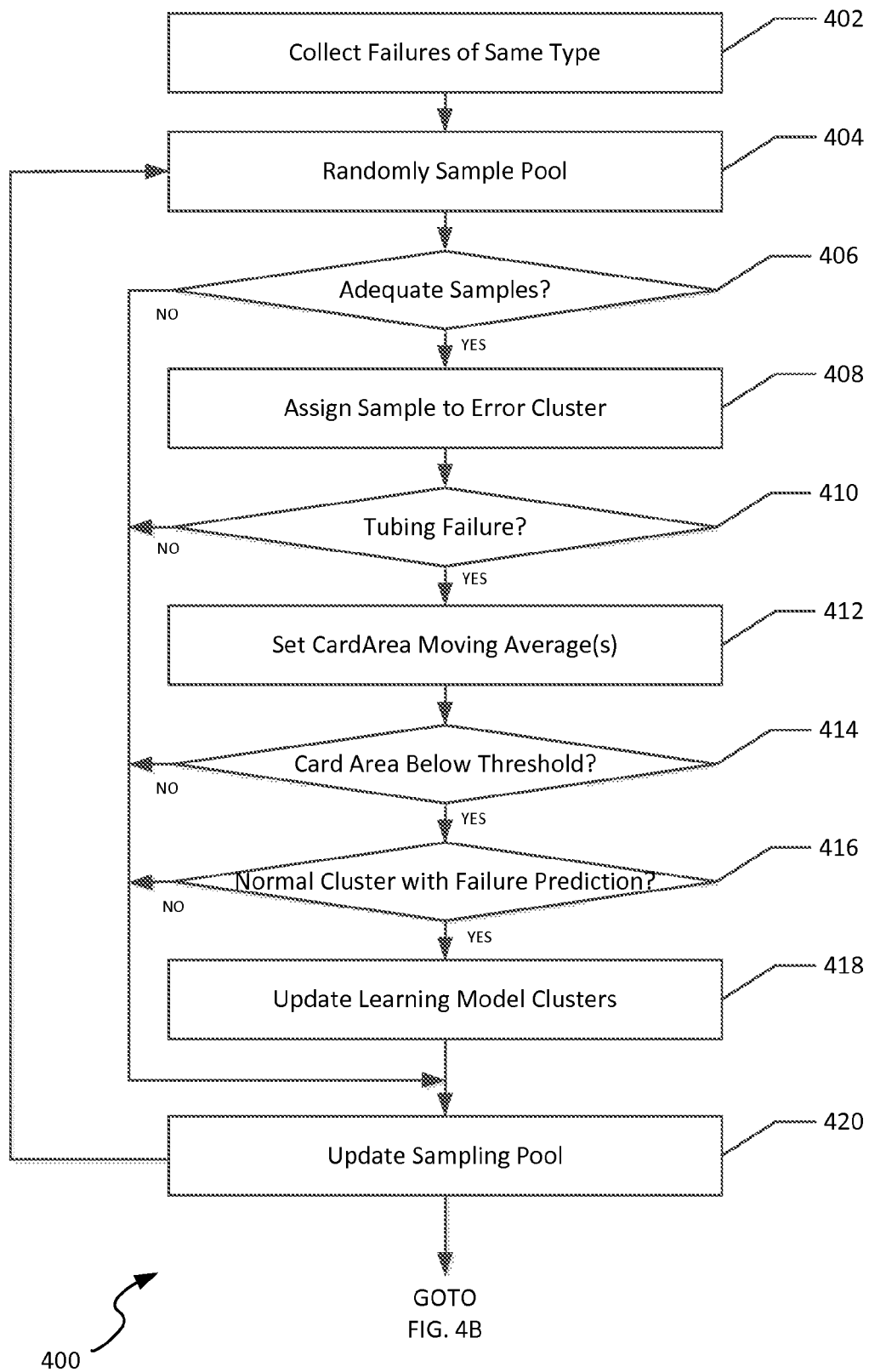
FIGS. 4A-4B illustrate a flowchart of a method for training a learning model regarding failures and pre-failure behavior of an artificial lift system, according to an example embodiment.
Figure 4B:
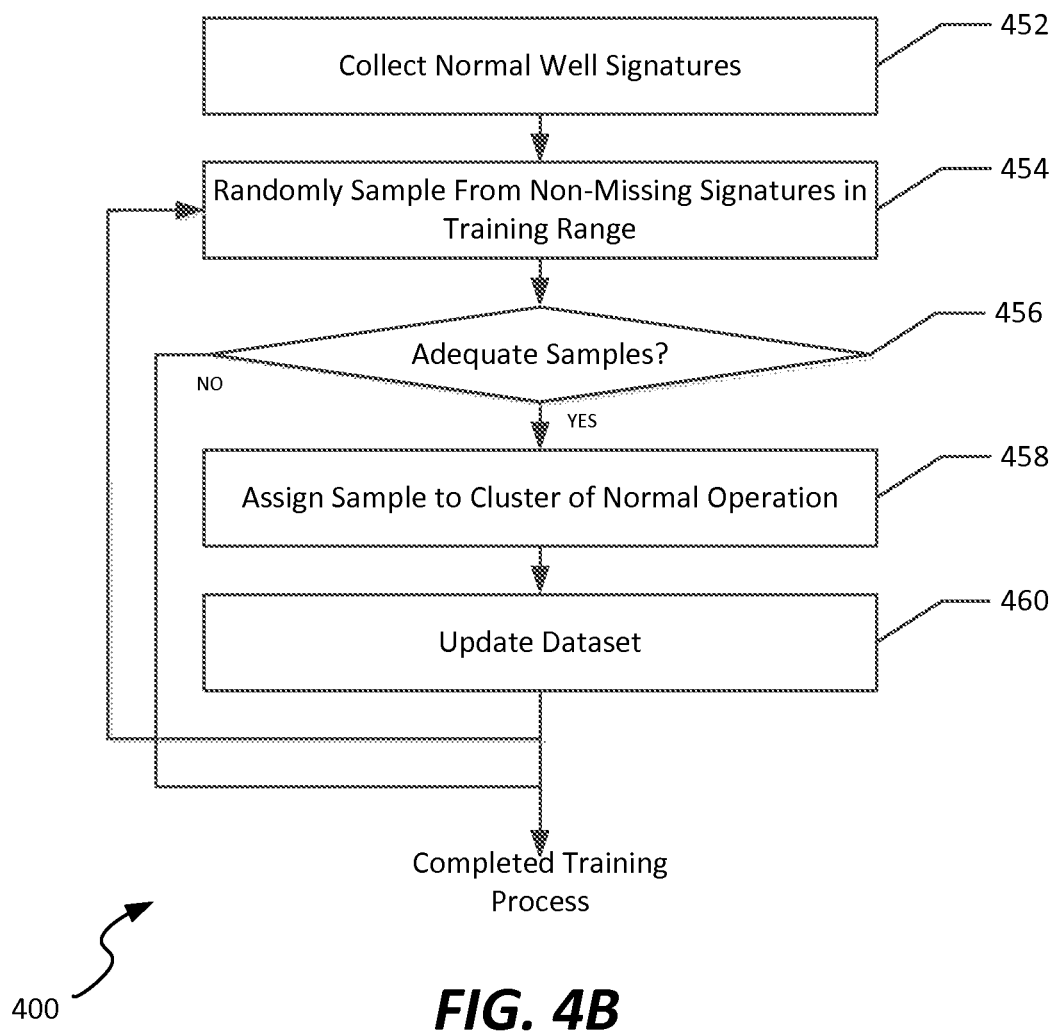

The clustering component 218 is used to assist in labeling training data to be used to generate a global model 220 from the various oil fields 104. In general, the clustering component allows a user to generate a labeled training set of data with which the global model 220 can be generated, for example using a Support Vector Machine (SVM). In an example embodiment, clustering component 218 can operate as illustrated in FIGS. 4A-4B, below, to cluster training data with normal operation, failure, or pre-failure modes of various types, such that subsequently-observed data (e.g., by failure prediction module 222) can be reviewed for errors analogous to those observed in the training data. The failure prediction module 222 is configured to, based on the global model, recognized one or more potential or actual failures. The monitoring interface 224 provides a user interface by which a user can view such failures as predicted and/or detected in the failure prediction module 222, or can provide input defining labels for use by clustering component 218.

Although a particular set of modules and components of the artificial lift surveillance tool 212 are discussed herein, it is noted that this is not intended as limiting; rather, other types or arrangements of modules and/or components could be incorporated into the computing system 200 as well. Furthermore, and referring to FIG. 2, generally, it is noted that although a single computing system 200 is shown logically in the figure, it is recognized that one or more such systems could be used to implement aspects of the artificial lift surveillance tool 212 described above, and therefore to implement an artificial lift surveillance tool useable to monitor and address potential failures in artificial lift systems, such as rod pumps, based on development of a global model for failure prediction in such systems.

Figure 3:
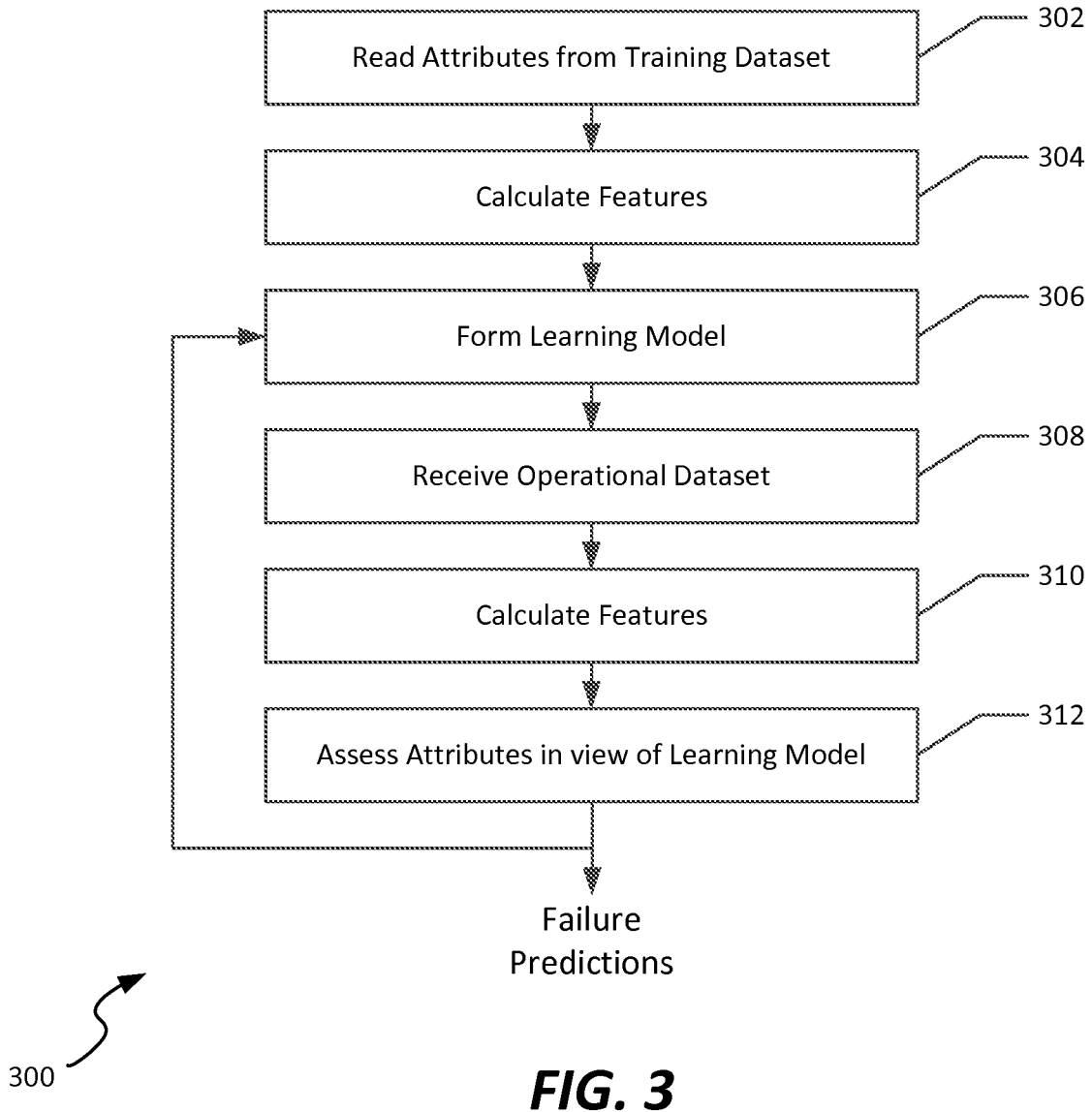
FIG. 3 illustrates a flowchart of a method for predicting failures in an artificial lift system using a global model for failure prediction, according to an example embodiment.

Referring now to FIG. 3 a flowchart of a process 300 for predicting failures in an artificial lift system using a global model for failure prediction is illustrated The process 300 can be performed, for example by the computing system 200 and associated tool 212 of FIG. 2, above. In the embodiment shown, the process 300 includes obtaining attributes from a training dataset, such as sampled data stored in a database 214 that includes known failures from artificial lift systems from a plurality of different oil fields (step 302). The process 300 further includes calculating features of the data set (step 304). This can include, for example, calculating one or more moving averages, such as by using a dual moving median representing various recent performance levels, as illustrated in FIG. 5. The processed features are then provided to a clustering component 218, which forms the global model 220 (step 306).

Once the learning model is formed, an operational dataset can be received by the computing system, for example at the database 214 (step 308). Features can be calculated from the operational dataset, analogous to the features calculated from the training dataset (step 310). Various attributes of the operational dataset are then compared to known failures as well as pre-failure conditions to determine whether one or more signatures of the dataset indicate that a failure has occurred (step 312).

Periodically, at least a portion of the operational dataset can be used, either alone or in conjunction with the training dataset, to re-train or recreate the global model 220. Accordingly, observed failures can be analyzed, in particular observed failures for which no previous pre-failure operation has been detected (e.g., if a particular predictable failure type was not included in the original training dataset).

Referring now to FIGS. 4A-4B, a method 400 is illustrated that can be used to train a global learning model regarding failures and pre-failure behavior of an artificial lift system. The method 400 can be performed, for example, by clustering component 218, to label and train a Support Vector Machine (SVM). In the embodiment shown, the method 400 includes collecting all failures of a particular type into a sampling pool (step 402). The failure type can take a number of forms, such as a tubing leak, complete malfunction, or other type of failure.

The method 400 also includes randomly sampling from the sampling pool (step 404). If there are an adequate number of samples (as determined at step 406), the samples are each assigned to an associated cluster affiliated with the type of failure (step 408). If there are an inadequate number of samples, the type of error cannot be learned, and the method passes to process either the next type of error, or normal operation. The number of samples required for training the global learning model may vary in differing embodiments; in some embodiments this value (shown as value D in the algorithm below) can be set by a user, or based on a number of training samples that are available, or based on a window within which a failure can be detected (e.g., a number of days included in a sliding window).

If the failure type is associated with a tubing failure (step 410), one or more moving averages are used to determine an associated moving average of historical operation of the artificial lift system, to determine whether pre-failure behavior exists which would allow the system to predict future failures (step 412). If the failure type is not associated with a tubing failure, the method proceeds to process either the next type of error, or normal operation.

In determining whether pre-failure behavior exists that would allow the system to predict future failures based on a tubing failure in step 412, a number of moving averages can be calculated, as noted in FIG. 2, and as illustrated in FIG. 5, below (step 414). If CardArea is below a specified threshold, it is then determined whether the artificial lift system is otherwise normally operating (other than the tubing failure) (step 416). If within a normal cluster, one or more learning model clusters is updated, in particular a pre-failure cluster, and normal operation cluster (step 418). Next, the sampling cluster is updated to remove the current sample (step 420), and the process is repeated with a next sample from the sample pool.

Referring to the portion of the process 400 illustrated in FIG. 4B, this portion relates generally to collection of normal operational behavior within training data, once all failure types (and failure predictions) have been captured. To that end, normal operation samples are captured (step 452), and a random sample is selected from among those normal operation samples (step 454). If adequate samples of normal operation exist (as determined in step 456), the samples are added to a normal operation cluster (step 458). The dataset of normal operation is then updated (step 460), and operation repeats at step 454 until all or an adequate number of training samples have been tested.

In general, the method 400 of FIGS. 4A-4B can be represented in the following algorithm; in this algorithm, an input corresponds to failure vs. normal rate r, and number of failure training example n, and the output of the method 400 corresponds to a labeled training set $s$ with $$\frac{r+1}{r} n$$

training well signatures:

1. Collect all failures of the same type from all available FMTs in a sampling pool $\mathcal{P}$
2. $\mathcal{S} = \emptyset$
3. Randomly sample $P \in \mathcal{P}, [P, f_{type}] = \{X_t\}_{t=1}^n$, where $X_n$ is the only non-missing signature before this failure date
4. If n < D then
   1. Goto Step 7 // Not enough signatures for labeling
5. Else
   1. [priors,idx] = EM(P,number or clusters = 3) # Expectation maximization of GMM
   2. $Cluster_{normal} = idx_{max_i priors(i)}$, $Cluster_{failure} = idx(n)$
   3. If $f_{type}$ = Tubing Failure then 1. $\mu_{CardArea} = \frac{1}{\text{count}(idx = Cluster_{failure})} \sum_{i, idx(i) = Cluster_{failure}} X_i(CardArea2)$ 2. If $\mu_{CardArea} > \lambda$ then  // Card is not shrinking enough
         1. Goto Step 7
      3. Endif
   4. Endif
   5. If $Cluster_{normal} \neq Cluster_{failure}$ and $Priors(idx_{normal}) > 0.5$ then
      1. $Cluster_{pre-failure} \leftarrow$ idx that remain assigned
      2. $\mathcal{S} = \mathcal{S} \cup \{(X_i, normal) | idx(i) = Cluster_{normal}\}$
      3. $\mathcal{S} = \mathcal{S} \cup \{(X_i, f_{type}) | idx(i) = Cluster_{failure}\}$
      4. $\mathcal{S} = \mathcal{S} \cup \{(X_i, prefail_{type}) | idx(i) = Cluster_{pre-failure}\}$
   6. Endif
6. Endif
7. $\mathcal{P} = \mathcal{P} - \{P\}$
8. Repeat Step 3 until failure training reaches n or $\mathcal{P} = \emptyset$
9. Collect all normal wells signatures from all available FMTs in a sampling pool $\mathcal{Q}$
10. Randomly sample $Q \in \mathcal{Q}, Q = \{X_t\}_{t=1}^n$, where $X_n$ is the most recent non-missing signature before of the well's valid training range
11. If n < D then
    1. Goto Step 16 // Not enough signatures for labeling
12. Else
    1. [priors,idx] = EM(P,number of clusters = 2) # Expectation maximization of GMM
    2. $Cluster_{normal} = idx_{max_i priors(i)}$ -continued

```
    3.  If Priors(idx_{normal}) > 0.5 then // Major cluster
        1. S = S ∪ {(X_i, normal)|idx(i) = Cluster_{normal}}
    4.  Endif
13. Endif
14. Q = Q − {Q}
15. Repeat Step 10 until failure training reaches ⌊n/r⌋ or Q = ∅
```

Using the above algorithm, more roughly labeled training data can be used to achieve a reliable model that would work across multiple fields. Drawbacks of a field-specific training model, namely the expensive training process which prevents it from being adapted in multiple fields, is avoided, while maintaining confidence that labeling tubing leak failures that exhibit consistent failure trends. However, confidence is lower for the failures without such trends. For such types of failures, we can label using a rule-enhanced statistical clustering algorithm. For rod pump failures, because of its various factors of root causes of such failures, a similar process can be used but with fewer rule constraints.

For prediction together with analyzing a particular artificial lift system and associated failures based on a timeline, some historical failures can be identified that show a clear normal-pre-failure-failure transition process. In this process, normal should be considered as a most common observation. However when the artificial lift system gets closer to failure, pre-failure signatures would appear in the operational data associated with that system that statistically differ from distributions represented by normal operation.

In the context of the present disclosure, a range of signatures mixed with normal and pre-failure are allowed, with all signatures finally converging to failures when data is close to the real failure events. Rules are used to constrain the clustering results to follow this process. For failures that fall out of this rule, these failure cases are excluded from being effective training candidate failures. This training set construction process can be performed by scanning existing failure and normal wells, for which the output clusters are labeled as the corresponding pre-failure type, failure type and normal examples. The labeled set, referred to as the training set, is then used to train the multi-class SVM so that it is capable of making prediction given future features.

Referring still to FIGS. 4A-4B, the 3-class clustering of training data into failures, pre-failures, and normal operation is useable for categorizing the failure signatures roughly, which is then filtered by rules. In some embodiments, it is assumed that, if there are not at least 100 non-missing signatures, the sample size is too small. Furthermore, when the clustering is done, the clusters have to be "discriminative" such that a normal cluster is dominating by taking over 50% of the time, and the failure cluster has to be associated with the real failure—the last example, while leaving the remaining cluster for pre-failure signatures. This process can be done in parallel, and sampling rules of training wells can be adjusted; however, in the embodiments discussed herein, random sampling is used. For normal operation examples, an analogous process is applied but instead of 3-class clustering, 2-class clustering can be used. In such cases, the major class corresponds to normal operation with over 70% distribution, while the smaller class is then discarded as noise.

Using the now-labeled training set, a multi-class support vector machine (SVM) is then trained to learn from all labeled cases. After the training process, the prediction model can then be evaluated.

Referring now to FIG. 5 a moving average 500 is shown by which pre-failure behavior is monitored, according to example embodiments. In the embodiment shown, the moving average 500 includes a dual moving median arrangement in which samples are monitored to determine average operation over a set of one or more sliding windows. In the embodiment shown, a set of samples 502 (labeled samples 1-15) represents a time series sampling of one or more measurements and/or calculated features associated with a particular artificial lift system. A sliding window 504 is applied to the samples 502, such that at least two medians are calculated in a dual moving median; a mid-term median representing a recent performance (e.g., over a past week), and a current performance representing a most recent number of days. These medians, referred to in FIG. 5 as Median$_1$ and Median$_2$ can be divided by a global median representing a sliding window of long-term performance (e.g., the last number of months, such as 3 months).

In the context of validation of the training process discussed above, This validation is performed on each well, and for those failure wells whose failures are successfully predicted, they are considered to be true positives (TP). For the normal wells that have failure alerts indicated, they are false positives. For the wells that have failures not predicted ahead of time or not predicted at all, they are considered to be false negatives (FN). A normal well that has no failure predicted is considered to be a true negative (TN).

Accordingly, different from previous evaluation approaches, the arrangement discussed in the present disclosure has an adequate gap to present time so that "ground truth" can be known. In previous approaches, false positive predictions are difficult to establish, because it is not straightforward to determine a truly false prediction—that false positive could be a failure in the future. Therefore, by creating a time gap that is sufficiently large to be certain of the well's true failure/normal status, it is possible to ensure that the algorithm works based on a particular validation set.

Figure 6:
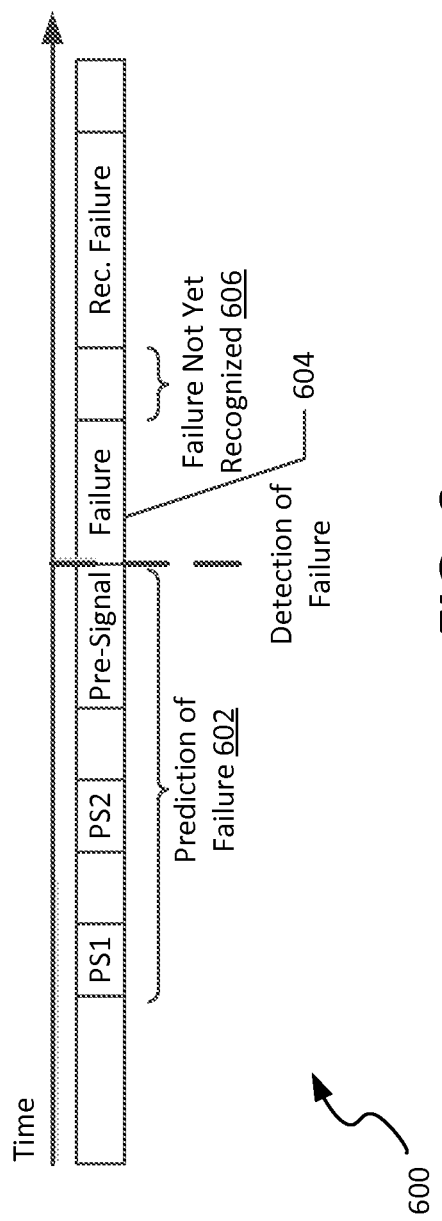
FIG. 6 illustrates a time signature of a failure prediction made using a learning model as discussed herein, as well as the resulting failure.

FIG. 6 illustrates a time signature 600 that includes a failure prediction made using a learning model as discussed herein, as well as the resulting failure. In the example shown, over time, a pre-failure signature 602, illustrated by PS1, PS2, and Pre-Signal, allows a global model to predict an upcoming failure at a time prior to occurrence of failure 604.

In particular, in order to evaluate the global model, Table 1 defines the term that we are going to use in this section. In FIG. 6, for evaluating a failure well, its recorded failure is marked by the failure 604. However a gap when the failure may not be recognized and thought to be normal may occur, as illustrated in FIG. 6 as gap 606. The beginning of the box labeled "Rec. Failure" corresponds to the time at which a field specialist detects the failure and records it in the database. The "Failure" box shows the date that the true failure begins, and the PS1, PS2, and Pre-Signal boxes are the pre-signals that happen prior to the failure. The other boxes prior to the failure correspond to normal operation, where no failure or pre-failure signals existed. A failure prediction is true only if it is within D days from the actual failure.

Referring now to FIGS. 7-10, experimental results are illustrated showing failure prediction as illustrated in FIG. 6, and failure detection arrangements enabled using the global model and dual moving median arrangements discussed herein.

In FIGS. 7-10, it is noted that based on the experiments conducted in association with development of the global model, the trends of the four most reliable attributes are the key indicators for a potential anomaly, plus two calculated features. The four features allowing for prediction of future failures are card area, peak surface load, minimum surface load, and daily runtime. The two additional calculated features are card unchanged days, and daily runtime ratio, described above.

Figure 7:
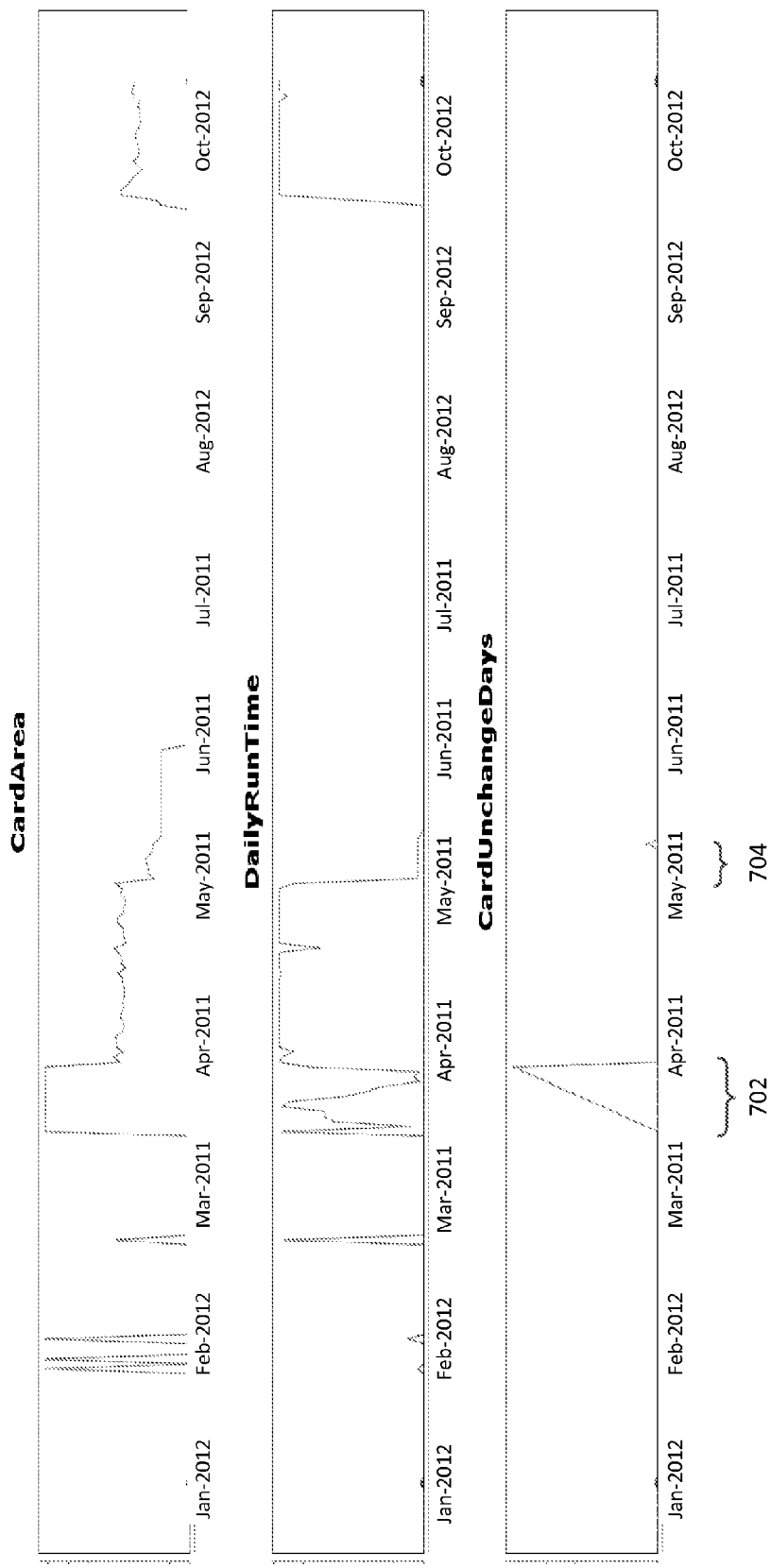
FIG. 7 illustrates a set of graphs depicting monitored features representing potential failures and pre-failure operation of an artificial lift system, according to an example embodiment.

Referring now in particular to FIG. 7, a set of graphs 700 are shown that depict monitored features representing potential failures and pre-failure operation of an artificial lift system. As shown in the set of graphs 700, there is a correlation between unchanging features and potential failures, based on seeing many sudden failures after episodes of unchanging features. This example is seen in the set of graphs 700, in which CardUnchangeDays accumulates between March 2012 and April 2012 (at timeframe 702). This accumulation is followed by a critical downfall of CardArea which ultimately leads to a tubing failure (i.e., at the point where DailyRunTime reaches zero), occurring nearly a month after accumulation of CardUnchangeDays (at timeframe 704). In many cases, this "unchanged days" marks either pump off controller problems that fail to read the parameters correctly, or the actual situation when the rod pump is problematic.

This observation is expected, since it is natural for daily data to fluctuate because of real-world uncertainties that govern complex systems. According to reliability studies of many fields, because models of complex systems are usually not accurate enough to predict reliably where critical thresholds may occur, it would be useful to build a set of reliable statistical procedure to test whether the environment is in a stable state, or at a critical tipping point in the future. This "statistical procedure", that exhibits the statistics for measuring system reliability, is the number of days that reliable critical attributes do not change (CardArea, PeakSurfLoad, MinSurfLoad). Here, by unchanging it is intended that the value of the feature not change by more than a single digit.

Figure 8:
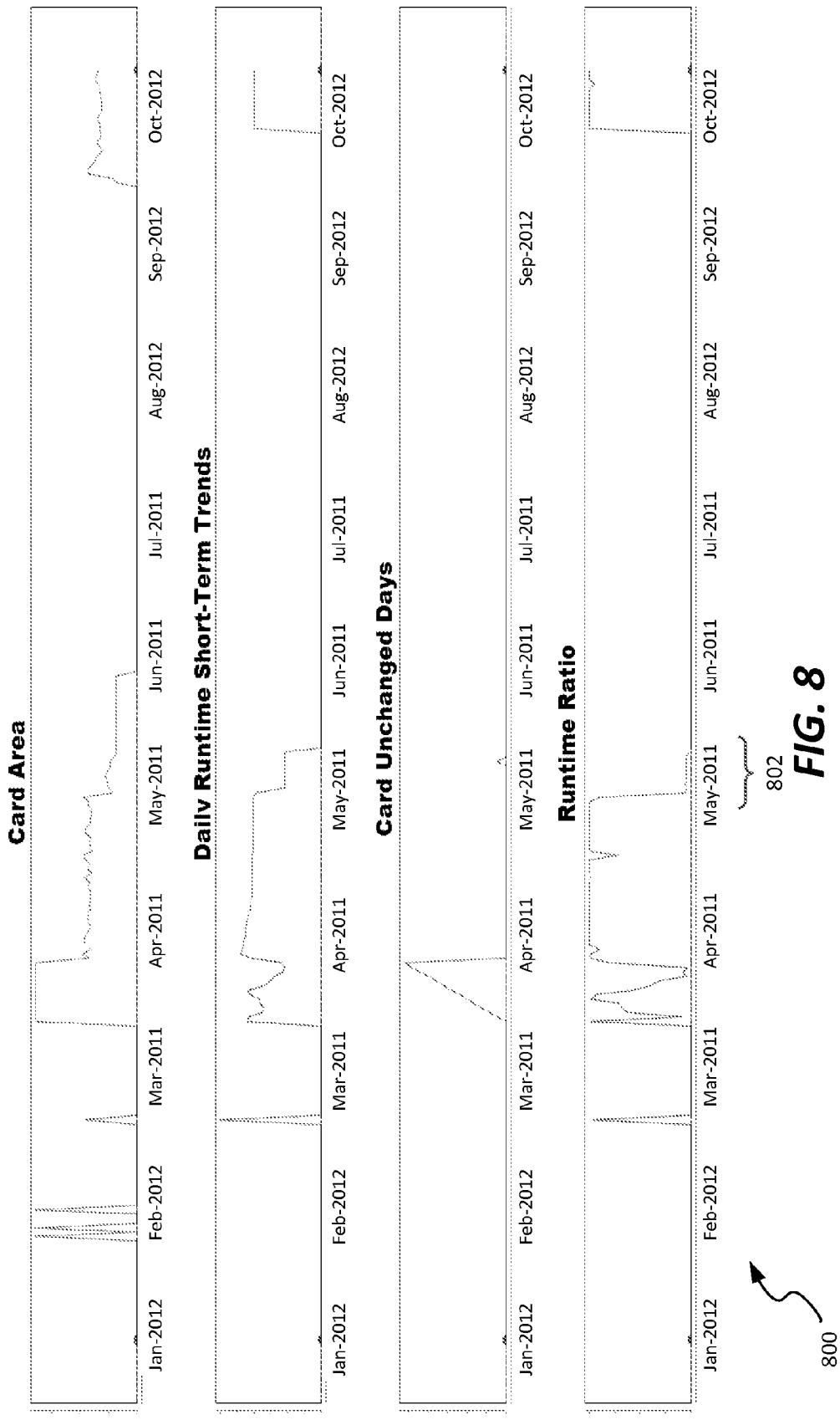
FIG. 8 illustrates a set of graphs depicting application of a moving window analysis to the monitored features of FIG. 7, showing potential failures and pre-failure operation of an artificial lift system according to an example embodiment.

FIG. 8 illustrates a set of graphs 800 depicting application of a moving window analysis to the monitored features of FIG. 7, showing potential failures and pre-failure operation of an artificial lift system according to an example embodiment. In FIG. 8, a calculated parameter referred to as "DailyRunTime2" is included among the parameters, and is a calculated sliding window of daily runtimes (shown as Daily Runtime Short-Term Trends). As seen in FIG. 8, Daily Runtime Short-Term Trends has not reached the tipping point around early May 2012 (at timeframe 802) when the system has already almost stopped functioning. However, RunTimeRatio captures this information in its earliest stage. By including this feature among the monitored features, it is expected that the failure predictions can be slightly "earlier" compared with previous predictions.

Figure 9:
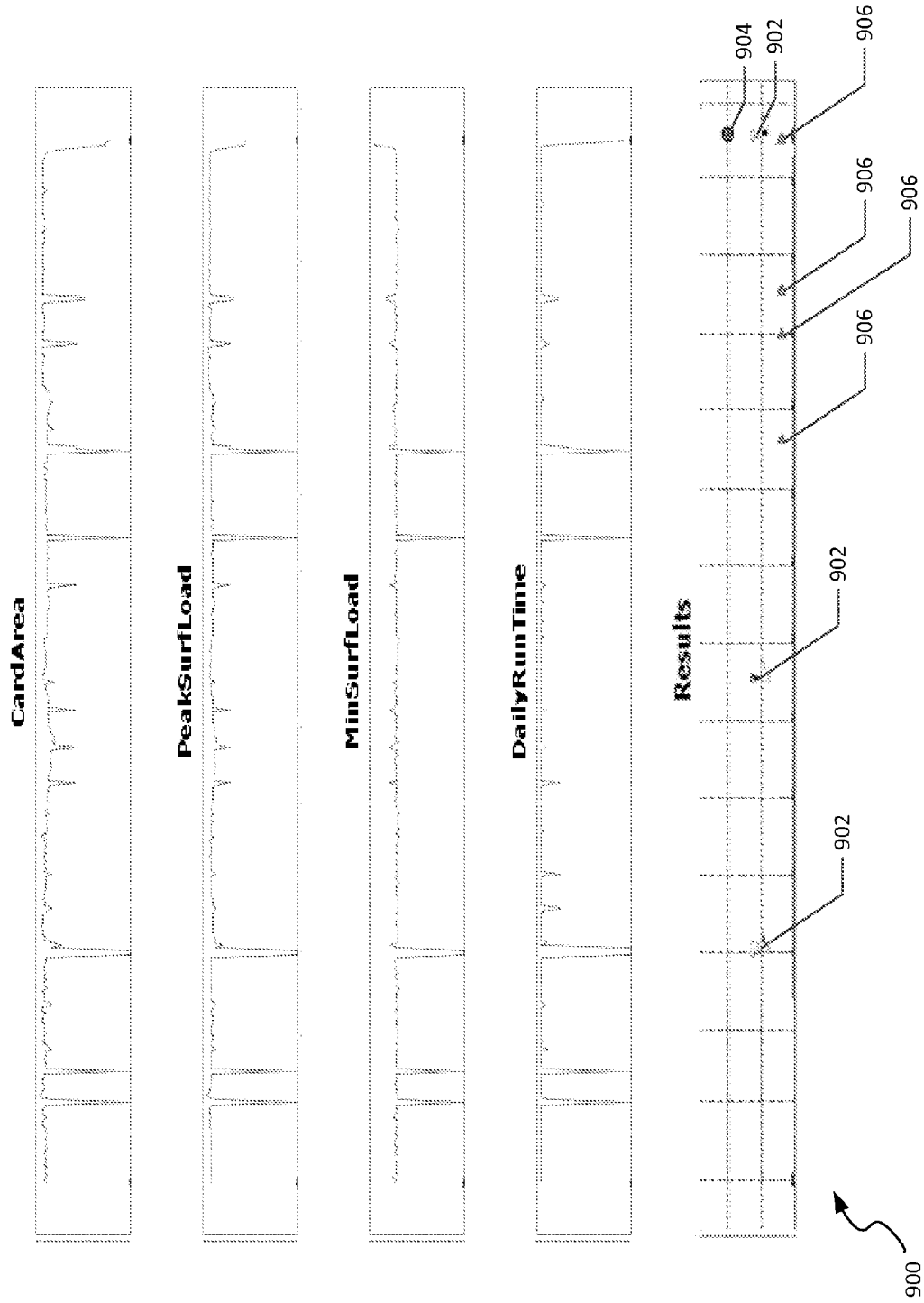
FIG. 9 illustrates a set of graphs depicting features of an artificial lift system in the event of a detected tubing leak and impending failure of the artificial lift system, according to an example embodiment.

FIG. 9 illustrates a set of graphs 900 depicting features of an artificial lift system in the event of a detected tubing leak and impending failure of the artificial lift system, according to an example embodiment. This represents a good example for successful tubing leak predictions. In FIG. 9, four major attributes are depicted as time series aligned by date. The bottom chart shows the downtime records 902, recorded failures 904 for tubing failure, and failure predictions 906 that correspond to detected tubing leaks. This example successfully began to predict a tubing leak because it recognized the failure trend of predictions 906 beginning at mid-October 2011 and repeated two more times in January 2012. Then the system truly failed (at failure 904 after the fourth predicted failure because of tubing failure caused by tubing holes).

Figure 10:
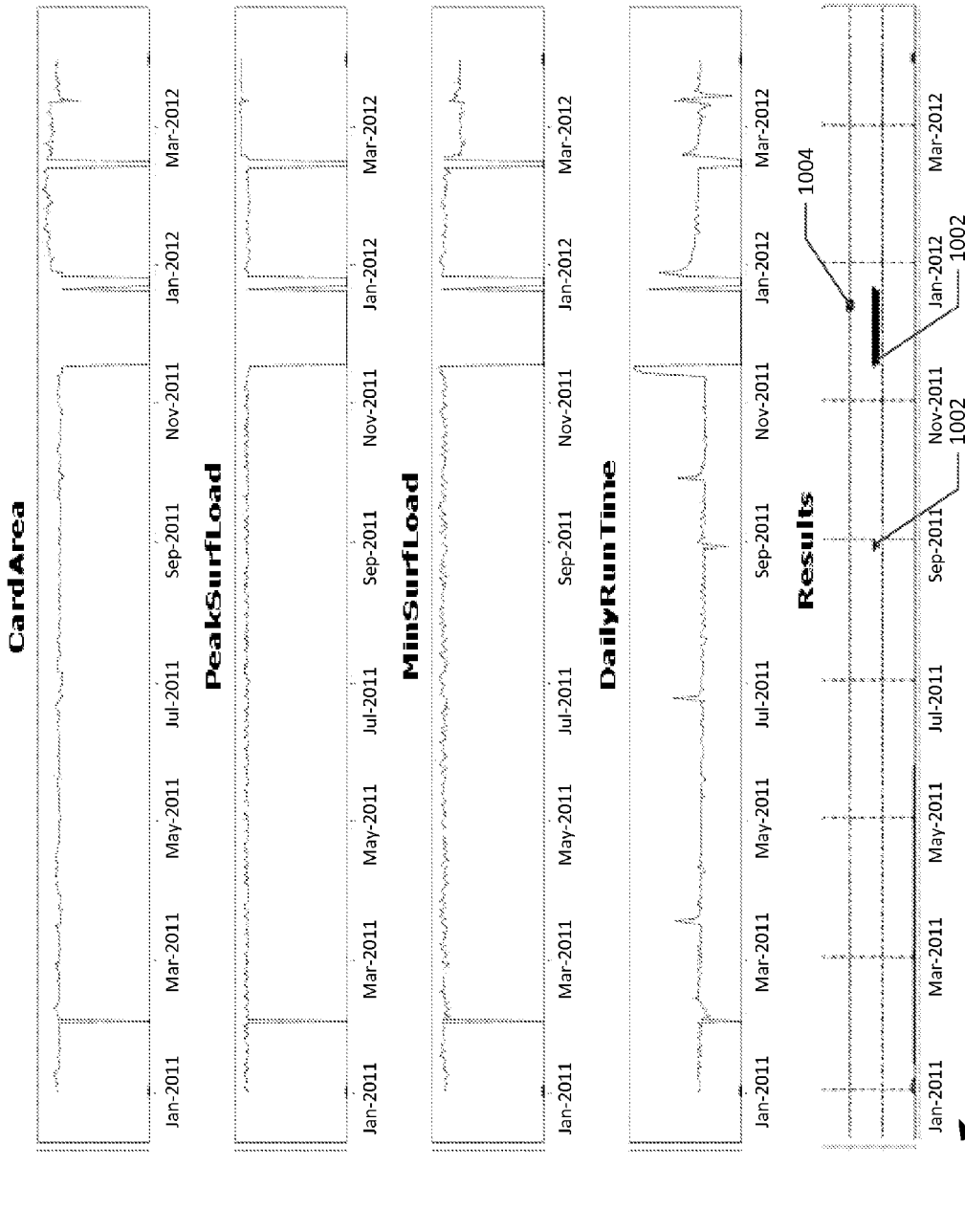
FIG. 10 illustrates a set of graphs depicting features of an artificial lift system in the event of a sudden failure, and subsequent detection of that failure, according to an example embodiment.

FIG. 10 illustrates a set of graphs 1000 depicting features of an artificial lift system in the event of a sudden failure, and subsequent detection of that failure, according to an example embodiment. In particular, the graphs 1000 depict a case of a sudden failure event 1002 and associated tubing failure 1004 that are not possible to detect using a learning model. This is because prediction relies heavily on the dynamics of data by their trends; if there are no significant trends (e.g., precursor tubing leaks or other pre-failure indicators), no global model or field-specific model would predict such an error ahead of time. Even the SMEs considered this as an impossible prediction task based on these attributes because they were in a perfectly normal range before failure. For such failures, the model discussed herein at least includes features (e.g., daily runtime) that allows for detection of these features (as opposed to prediction).

In validating the global model discussed above, a number of experiments were performed using a data set taken from five real-world assets using rod pump artificial lift systems, and which contain nearly 2,000 rod pumps (1947 total). The training data was captured between Jan. 1, 2010 and Jan. 1, 2011, and the validation range corresponds to the following year. In the experiments conducted to validate the model discussed herein, the prediction threshold is set to 100 days, meaning that if within 100 days of an actual failure we have prediction, then it is a true positive. If a failure prediction is made but the actual failure happens beyond 100 days, then this is considered to be a false positive. For a normal well, if a failure prediction alerts, then it is considered to be a false negative. During the experiments, electrical maintenance may change the value of the trends; accordingly, alerts were filtered out that were produced within 15 days of the down time. Finally, for the training set, the ratio of failures was set to be 0.8 with 50 failures, which means that the training set contains 50 failure wells' samples as well as 350 normal wells' samples.

In a set of experimental results relating to calculated attributes it is noted that the following test results were observed:

TABLE 1

Predicted and True Operation Assessment

|  | True Failure | True Normal |
|---|---|---|
| Predicted Failure | 278 | 145 |
| Predicted Normal | 141 | 1383 |

In general, the results illustrate that the global model of failure prediction is capable of capturing future artificial lift system (e.g., rod pump and tubing failures) with acceptable precision and recall. The resulting global model is scalable and can be used for predicting failures for proactive maintenance to reduce lost oil production. Results from these experiments, using data from multiple fields, show that precision and recall are better than 65% with this global model, which is comparable to use of field-specific models. In particular, Table 1 illustrates a precision (a ratio of true predicted events over all predicted events) of 65.7%, and a recall (a ratio of corrected predicted events to the number of true predicted events) of 66.4%.

In specific experimental uses validating the global model, field-specific results including field-specific precision and recall were compared to the global model in Table 2, below. As seen in Table 2, Field 1 has the greatest recall as 88.5%, but it also has a lower precision of 53.5% compared with field 2, 3, and 4. Field 5 has the lowest precision and recall. We discovered that rather than the failures which exhibit trends before failing, Field 5 has more sudden failures—failures caused by sudden event like rod parted, joint split—than other fields.

TABLE 2

Failure Prediction Rates Based on Global Model

| Field | Prediction | True Failure | True Normal | Precision (%) | Recall (%) |
|---|---|---|---|---|---|
| 1 | Failure | 54 | 47 | 53.5 | 88.5 |
|   | Normal | 7 | 392 |  |  |
| 2 | Failure | 73 | 18 | 80.2 | 69.5 |
|   | Normal | 32 | 190 |  |  |
| 3 | Failure | 72 | 25 | 74.2 | 69.9 |
|   | Normal | 31 | 271 |  |  |
| 4 | Failure | 39 | 15 | 72.2 | 60.0 |
|   | Normal | 26 | 193 |  |  |
| 5 | Failure | 40 | 40 | 50.0 | 47.1 |
|   | Normal | 45 | 337 |  |  |

Compared with field-specific model which has 87% for recalls and 42% for precision, the global model shows even better results: 1.5% higher in recall and 11.5% higher in precision. In general, because of the generalization that involves multiple fields' training samples, the global model tends to be less "aggressive" than field-specific model at predicting failures. However global model learns from more failures across multiple fields that makes it adaptive to more varied failure signatures. This cross-field learning also prevents the global model from generating as many false alerts as is the case of the field-specific model. Most importantly, global model is scalable and can be generalized to more fields, or readily adapted to additional fields during one of a number of periodic update/training processes.

Referring generally to the systems and methods of FIGS. 1-10, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media. Further, the disclosed methods' stages may be modified in any manner, including by reordering stages and/or inserting or deleting stages, without departing from the overall concept of the present disclosure.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method for predicting failures in an artificial lift system, the method comprising:
   extracting one or more features from a dataset including time sampled performance of a plurality of artificial lift systems disposed across a plurality of different oil fields, the dataset including data from failed and normally operating artificial lift systems;
   identifying pre-failure signatures based at least in part on a moving window of operational data in the extracted features preceding a known failure;
   forming a learning model based on identified pre-failure signatures in the extracted features, the learning model configured to predict a failure of an artificial lift system based on observation of one of the identified pre-failure signatures in operational data received from the artificial lift system; and
   predicting one or more failures in an artificial lift system based on the learning model.

2. The method of claim 1, wherein forming the learning model includes labeling the extracted features to define inter-relationships among the features included in the dataset.

3. The method of claim 2, wherein forming the learning model includes training a multi-class support vector machine using the labeled extracted features.

4. The method of claim 1, wherein extracting one or more features includes applying a moving median feature extraction process to the dataset.

5. The method of claim 4, wherein the moving median feature extraction process calculates a global median, a mid-term performance median, and a current performance median.

6. The method of claim 5, wherein extracting the one or more features includes calculating features by dividing at least one of the mid-term performance median or the current performance median by the global median.

7. The method of claim 1, wherein the dataset includes measurements of attributes from a plurality of pump off controllers.

8. The method of claim 7, wherein the attributes are selected from a group of attributes consisting of:
   card area;
   peak surface load;
   minimum surface load;
   strokes per minute;
   surface stroke length;
   flow line pressure;
   pump fillage;
   prior day cycles; and
   daily run time.

9. The method of claim 8, further comprising calculating a card unchanged days attribute based on a number of days of one or more unchanged attributes received from a pump off controller.

10. The method of claim 8, further comprising calculating a daily runtime ratio based on the daily run time.

11. The method of claim 1, further comprising evaluating a precision of the failure prediction.

12. The method of claim 1, further comprising periodically updating the learning model with a refreshed dataset including time sampled performance of the plurality of artificial lift systems.

13. A computer-readable medium having computer-executable instructions stored thereon which, when executed by a computing system, cause the computing system to perform a method for predicting failures in an artificial lift system, the method comprising:
   extracting one or more features from a dataset including time sampled performance of a plurality of artificial lift systems disposed across a plurality of different oil fields, the dataset including data from failed and normally operating artificial lift systems;
   identifying pre-failure signatures based at least in part on a moving window of operational data in the extracted features preceding a known failure;
   forming a learning model based on identified pre-failure signatures in the extracted features, the learning model configured to predict a failure of an artificial lift system based on observation of one of the identified pre-failure signatures in operational data received from the artificial lift system; and
   predicting one or more failures in an artificial lift system based on the learning model.

14. A system for predicting failures in an artificial lift system, the system comprising:
   a processor;
   a memory communicatively connected to the processor and storing computer-executable instructions that, when executed by the processor, cause the system to:
   receive a dataset of time-sampled data from each of a plurality of artificial lift systems disposed across a plurality of different oil fields, the dataset including data from failed and normally operating artificial lift systems;
   receive data labels from a user, the data labels defining one or more types of failures of artificial lift systems;
   identify pre-failure signatures based at least in part on a moving window of operational data in the extracted features preceding a known failure included in the one or more types of failures;
   generate a learning model by a multi-class support vector machine based on the labeled data, the learning model including one or more identified pre-failure signatures and predict a failure of an artificial lift system based on observation of one of the identified pre-failure signatures in operational data received from the artificial lift system.

15. The system of claim 14, wherein the plurality of artificial lift systems disposed across a plurality of different oil fields include one or more artificial lift systems selected from a group of systems consisting of:
   a gas lift;
   a hydraulic pumping unit;
   an electric submersible pump;
   a progressive cavity pump; and
   a rod pump.

16. The system of claim 14, wherein the system is further configured to extract one or more features from a dataset based on labels applied to the time-sampled data.

17. The system of claim 14, wherein updated data is provided to the multi-class support vector machine to generate an updated learning model.

18. The system of claim 14, wherein the system is further configured to apply a clustering algorithm comprising:
   collecting data representing artificial lift system failures having a common failure type into a first cluster; and
   determining one or more pre-failure signatures in the time-sampled data.

19. The system of claim 18, wherein the clustering algorithm further includes collecting data representing normal operation of an artificial lift system into a second cluster.

20. The system of claim 14, wherein the dataset includes measurements of attributes, and wherein the attributes are selected from a group of attributes consisting of:
   card area;
   peak surface load;
   minimum surface load;
   strokes per minute;
   surface stroke length;
   flow line pressure;
   pump fillage;
   prior day cycles; and
   daily run time.

21. The method of claim 1, wherein the plurality of artificial lift systems disposed across a plurality of different oil fields include one or more artificial lift systems selected from a group of systems consisting of:
   a gas lift;
   a hydraulic pumping unit;
   an electric submersible pump;
   a progressive cavity pump; and
   a rod pump.

* * * * *